Dec. 29, 1964
M. W. KRUEGER ETAL
3,163,435
TRANSPORT TANK
Filed Dec. 11, 1961
4 Sheets-Sheet 1
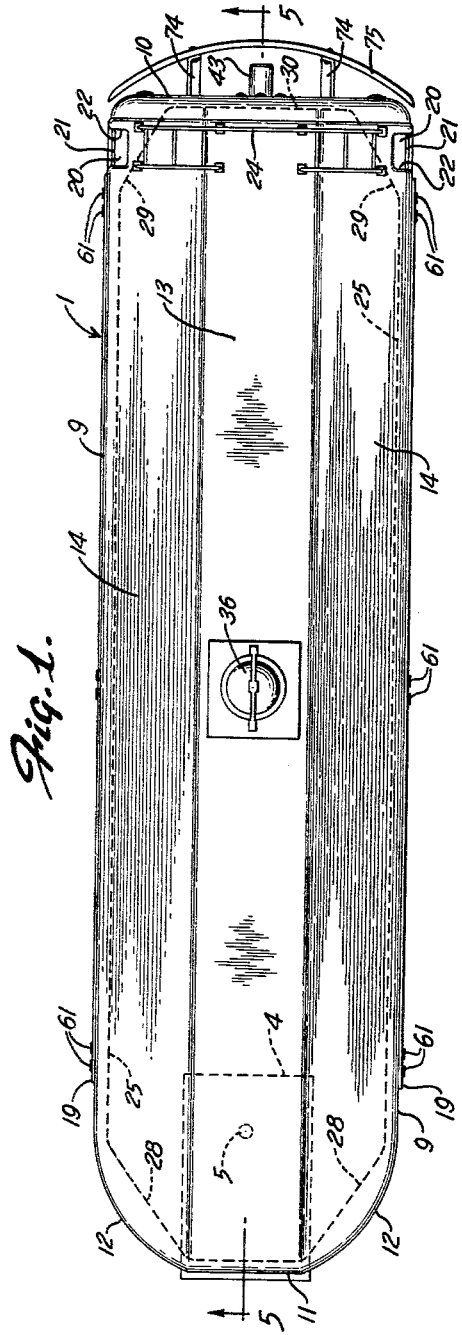
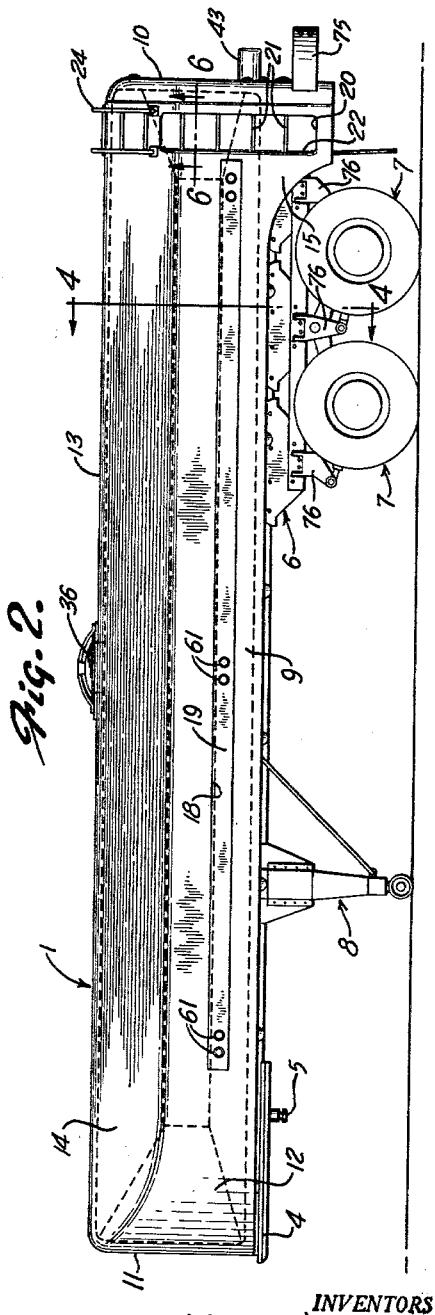
INVENTORS.
Melvin W. Krueger
BY George B. Luhman, Jr.
Andrus & Starke
Attorneys

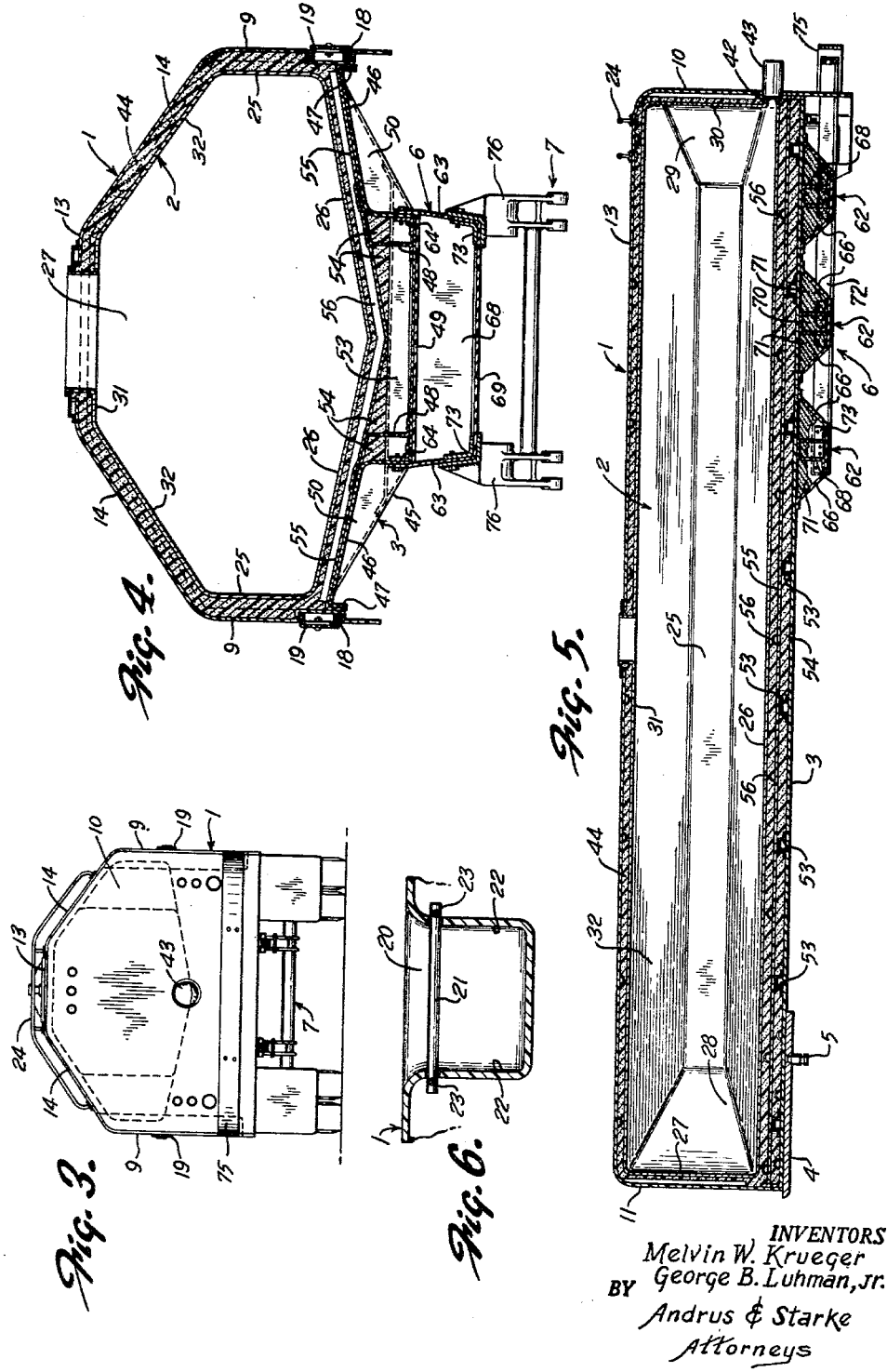

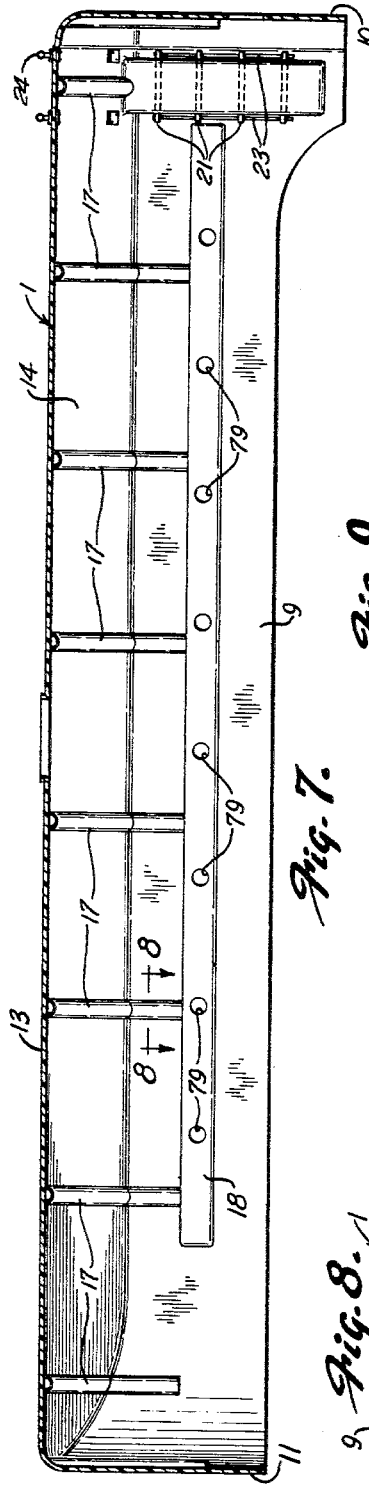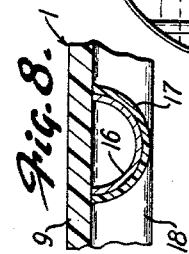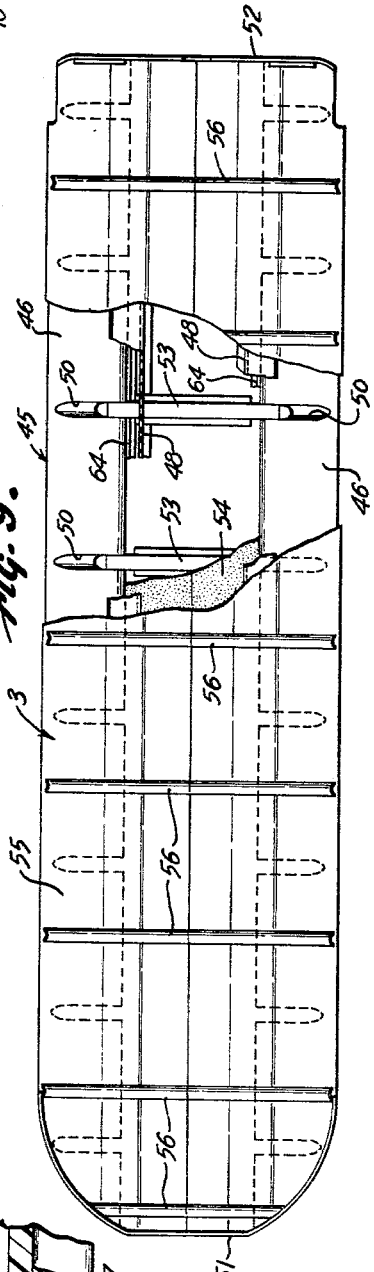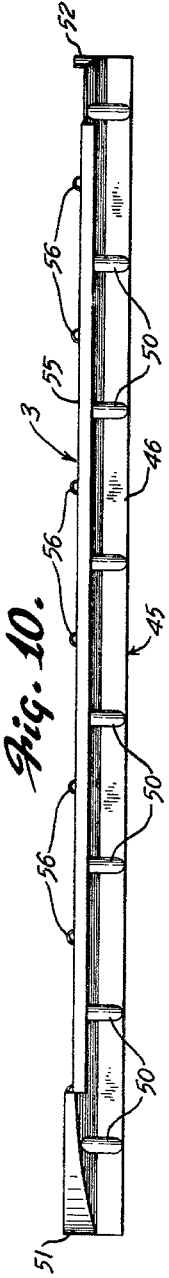

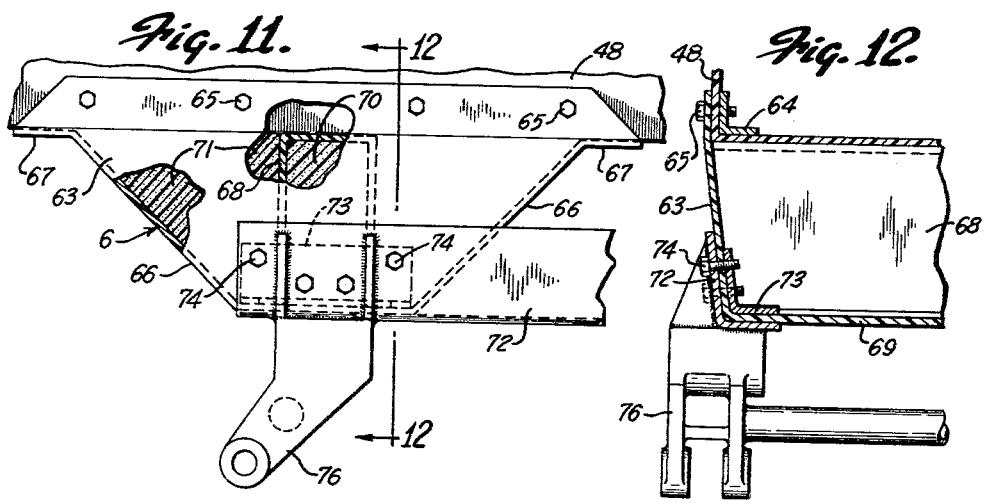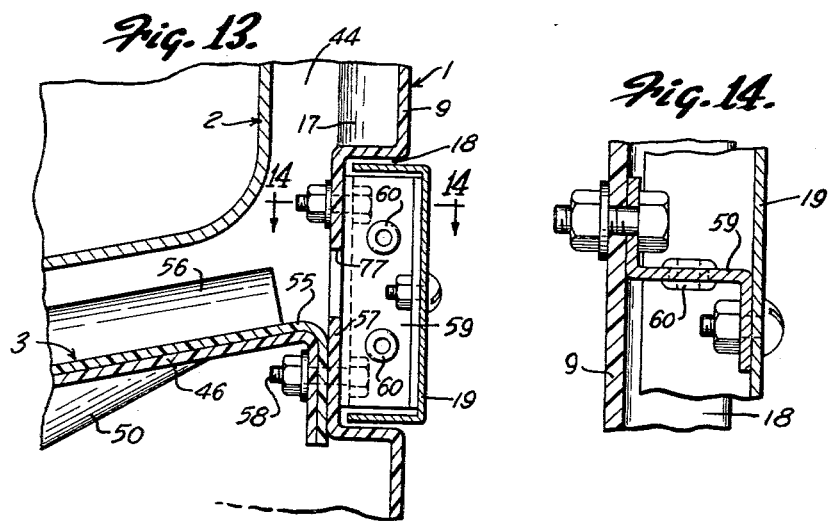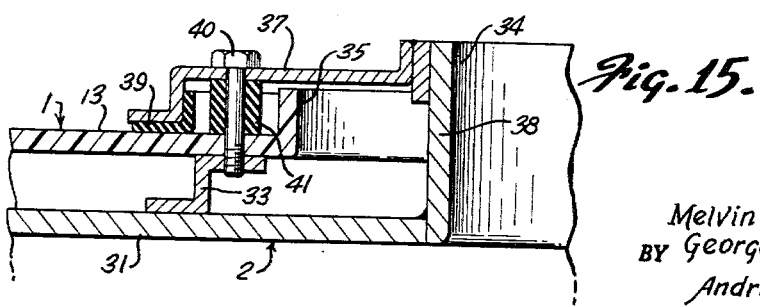

3,163,435
TRANSPORT TANK

Melvin W. Krueger, Madison, and George B. Luhman, Jr., Monona Village, Wis., assignors to Dairy Equipment Company, Madison, Wis., a corporation of Wisconsin
Filed Dec. 11, 1961, Ser. No. 158,413
10 Claims. (Cl. 280—5)

This invention relates to a transport tank for bulk delivery or pickup service and more particularly to a reinforced plastic transport tank.

In the trucking industry, milk and other bulk commodities are transported in semi-trailer transport tanks which generally include an inner stainless steel tank to contain the bulk material and an outer shell which is formed of either stainless steel or some other metal. Recently there has been increased activity in developing lighter weight transport tanks in order to increase the payload. As the axle weight is limited, by reducing the dead load of the tank an increased payload can be achieved while maintaining the axle weight requirements.

The present invention is directed to a semi-trailer transport tank and includes a reinforced plastic outer shell or casing which contains an inner stainless steel tank. The shell and tank are supported on a reinforced plastic saddle and a layer of foam plastic is disposed between the shell and tank and between the tank and saddle and bonded thereto to provide an integral structure.

The forward end of the saddle supports a plate which carries a kingpin adapted to be connected to the fifth wheel on a tractor, while the rear end of the saddle carries a series of reinforced plastic pods which are connected to the lower surface of the saddle and support the wheel assembly. Each pod includes a hollow, reinforced plastic shell which is filled with foam plastic.

The stainless steel inner tank and the outer shell are both provided with flat vertical side walls and a flat top surface which are connected by diagonally extending surfaces. The diagonal surfaces provide added strength for both the tank and the shell and increase visibility to the rear for the driver of the tractor. The diagonal surfaces serve to reduce the area of the flat upper surface of the tank and thereby tend to decrease the possibility of collapse of the upper surface if the milk is drained out of the tank without releasing the vacuum in the tank.

The rear portions of the side walls of the tank extend diagonally and are connected to the rear wall of the tank. The outer shell, however, is not provided with the diagonal surface at the rear end so that a substantial space is provided between the shell and the tank at the rear of the transport. The shell is built to the full width of the state vehicle code requirements and the ladder wells are recessed within the side walls of the shell and extend laterally into the space between the shell and tank at the rear of the transport. By utilizing the full width, the height and center of gravity of the inner tank is lowered which results in better roadability and handling of the truck.

The foam plastic serves to bond the tank, saddle and shell together as an integral, one-piece unit which is substantially stronger than assembled, all metal tank bodies. Furthermore, the foam plastic will not absorb moisture as will other core materials such as cork or balsawood, and the heat conductivity of foam plastic is approximately ½ that of cork or balsawood, thereby providing a greater degree of insulation for the material contained within the tank. The foam plastic is a lightweight cellular material which substantially reduces the overall weight of the transport tank and thereby correspondingly increases the quantity of material which can be transported in the tank.

Other objects and advantages will appear in the course of the following description.

The drawings illustrate the best mode presently contemplated of carrying out the invention.

In the drawings:

FIG. 1 is a plan view of the transport tank of the invention;

FIG. 2 is a side elevation of the transport tank;

FIG. 3 is an end view of the transport tank;

FIG. 4 is a transverse section taken along line 4—4 of FIG. 2;

FIG. 5 is a longitudinal section taken along line 5—5 of FIG. 1 with the wheel assembly not shown;

FIG. 6 is an enlarged section taken along line 6—6 of FIG. 2;

FIG. 7 is a longitudinal section of the outer shell;

FIG. 8 is an enlarged section taken along line 8—8 of FIG. 7;

FIG. 9 is a plan view of the saddle with parts broken away in section;

FIG. 10 is a side elevation of the saddle;

FIG. 11 is an enlarged side elevation of a wheel supporting pod;

FIG. 12 is a section taken along line 12—12 of FIG. 11;

FIG. 13 is an enlarged fragmentary transverse section showing the attachment of the saddle to the shell;

FIG. 14 is a section taken along line 14—14 of FIG. 13; and

FIG. 15 is a vertical section showing the attachment of the shell to the manhole flange of the tank.

The drawings illustrate a semi-trailer transport tank for hauling milk or other bulk material which comprises an outer shell 1 which houses an inner tank 2. Both the shell 1 and tank 2 are supported on a saddle 3.

The lower surface of the forward end of the saddle 3 carries a kingpin plate 4, and a kingpin 5 connected to plate 4 is adapted to be engaged with the fifth wheel on a tractor so that the transport tank can be hauled by the tractor.

The rear portion of the saddle 3 carries a wheel support unit 6 which supports a pair of wheel assemblies 7. In addition, a forward wheel unit 8 is secured to the saddle at a location to the rear of the plate 4 and serves to support the transport tank when the same is not connected to the tractor. The forward wheel unit 8 is of conventional design and forms no part of the present invention.

The shell 1 includes a pair of vertical side walls 9 which are connected together by a rear wall 10 and a front wall 11. The forward portions of the side walls 9 which are connected to the front wall 11 are curved as indicated by 12.

The shell 1 also includes a horizontal top wall 13 and a pair of diagonal walls 14 which connect the top wall to the upper edges of the side walls 9 to provide an integral shell. The rear portion 15 of each side wall 9 is curved downwardly and is connected to the lower edge of the rear wall 10 which has a substantially greater vertical height than the side walls 9.

The shell 1 is formed of reinforced plastic. The resin or plastic to be used can be any of the conventional thermosetting resins such as polyester, epoxy, silicone and the like. The reinforcement for the resin may be mineral or ceramic fibers such as glass or asbestos, vegetable or animal fibers, synthetic fibers and the like. In addition, metal strips or strands, such as wire, can also be employed as the reinforcement for the resin. The reinforcing material may be in the form of chopped short fibers, matting, woven fabric, unidirectional fiber strands, netting and the like. The reinforcing material impregnated with the uncured thermosetting resin is molded by conventional molding procedures to provide the shell 1.

To provide additional reinforcement for the shell, a series of elongated members 16 are embedded within the walls of the shell and form internal ribs 17. As best shown in FIGS. 7 and 8, the members 16 are generally semicircular in cross section and are formed of plastic, cardboard, metal mesh or the like. The hollow interior of the members 16 may be filled with a lightweight core material such as foam plastic, if desired. The members 16 are applied to the inner surface of the shell 1 and additional quantities of fibrous reinforcement and resin are applied over the members to embed the members within the wall. While the members 16 are shown as having a semicircular cross section, they may have any desired cross sectional shape which will serve as a form for the ribs 17.

Each of the side walls 9 of the shell 1 is provided with a horizontal recess 18 which receives a trim strip 19 made of stainless steel or the like. In the completed transport tank, the outer surface of the trim strip 19 extends outwardly a slight distance beyond the side wall 9 and serves as a rub rail.

In addition, the rear portion of each side wall 9 is provided with a vertically extending ladder well 20. A series of rungs 21 are disposed in aligned openings in the side walls 22 of the ladder well 20 and vertical rods 23 are secured within aligned holes in the ends of the rungs and prevent rotation and displacement of the rungs.

An external ladder or catwalk 24 is disposed in alignment with the ladder wells 20 and is secured to the diagonal walls 14 and top wall 13 of the shell.

The tank 2 which is adapted to contain milk or other bulk material is formed of stainless steel or other corrosion resistant material. As best shown in FIGS. 4 and 5, the tank 2 includes a pair of generally vertical side walls 25 and a pair of sloping bottom walls 26 which are connected to the lower edge of the side walls and diverge downwardly toward the longitudinal center of the tank. The tank 2 also includes a front wall 27 and the front portions of the side walls 25 are disposed diagonally as indicated by 28 and are connected to the front wall. Similarly, the rear portions of the side walls 25 extend diagonally as indicated by 29 and are connected to a rear wall 30. The tank is enclosed by a generally flat top wall 31 which is connected to the side walls 25 by diagonal walls 32.

The diagonal walls 28 enable the tank to conform to the curved surfaces 12 of the outer shell. The curvature 12 enables the transport tank to be more easily turned or jacknifed without interfering with the tractor cab.

The diagonal surfaces 29 of the tank provide a space within the outer shell which accommodates the ladder wells 20 at the rear end of the shell. This feature enables the shell to be built to the full width of the state vehicle code requirements, for the ladder rungs are located inwardly of the side walls of the shell.

The upper surface 31 of the tank 2 is spaced from the top wall 13 of the shell 1 by a series of Z bars 33 which are disposed in spaced relation and extend transversely of the tank, as shown in FIG. 15.

To provide access to the tank, a manhole 34 is formed in the upper surface 31 and is disposed in alignment with an opening 35 in the shell. The manhole 34 is enclosed by a suitable hinged manhole cover 36. As shown in FIG. 15, the inner annular edge of a deck plate 37 is welded to the flange 38 bordering the manhole 34, while the outer edge of the deck plate 37 is spaced from the shell 1 by a gasket 39. The deck plate is connected to the shell and tank by a series of bolts 40 which extend through aligned openings in the deck plate 37, shell 1 and Z bars 33. Rubber grommets 41 serve to space the deck plate from the shell 1 and also seal out moisture. The cover 36 which encloses the manhole is hinged to the deck plate 37. The construction of the manhole is similar to that shown in the copending application, Serial No. 95,578, filed March 14, 1961, of Melvin W. Krueger.

The milk or other bulk material is drained from the tank 2 through a drainpipe 42 which communicates with the lower rear end of the tank and extends through a suitable opening in the end wall 10 of the shell. The drainpipe 42 is provided with a valve or other shutoff device which is enclosed by a dust cover 43.

The entire area between the shell 1 and the tank 2 is filled with a foam plastic material 44 which is bonded to the shell and the tank and serves to connect the members together as an integral unit. The foam plastic is a closed cell, cellular material such as polyurethane, polyvinylchloride, polyethylene, polyester blends and the like. The plastic foam has a density generally in the range of about 2.0 to 2.5 pounds per cubic foot and serves not only to unite the shell and the tank as an integral unit, but provides excellent insulation for the material contained within the tank. The foam plastic is a lightweight, high strength material and will not absorb moisture so that there is no danger of decomposition or mildew.

The use of the polyurethane resin has proven very satisfactory and this resin is prepared by reacting a polyester of adipic acid and ethylene or propylene glycol, esterified and polymerized to a molecular weight of approximately 2000, with a di-isocyanate. The resin is preferably blown with a gas such as Freon 11 which produces a more uniform closed cell structure.

The saddle 3, which supports the shell 1 and tank 2, includes a base section 45 having a pair of inwardly and downwardly sloping walls 46 which terminate at their outer extremities in downwardly extending flanges 47. The base section 45 also includes a pair of spaced, longitudinally extending hollow ribs 48 and a flat central surface 49 connects the lower extremities of the ribs.

To provide additional stiffness for the base section 45, a plurality of outrigger ribs 50 are formed in the walls 46 and the outrigger ribs 50 extend laterally from the ribs 48 outwardly toward the flanges 47.

The front of the saddle is enclosed by an end wall 51 while the rear of the saddle is enclosed by a similar wall 52. The base section 45, end walls 51 and 52 are all formed of fiber reinforced plastic similar to shell 1 and the end walls are formed integrally with the base section 45.

The longitudinal ribs 48 are tied together by a plurality of spaced, hat-shaped stiffeners 53 which rest on the central surface 49, and the ends of stiffeners 53 pass through openings in ribs 48 and extend into outrigger ribs 50. The stiffeners 53 may be formed of plastic, cardboard, metal mesh or the like. The stiffeners 53 are positioned on the surface 49 and additional quantities of fibrous reinforcement and resin are applied over the stiffeners to secure the stiffeners to the surface 49, ribs 48 and ribs 50.

As best shown in FIGS. 4 and 9, the space within the outrigger ribs 50, the space within the stiffeners 53, the space inside of each rib 48 and the area between the ribs 48 are filled with a foam plastic material 54 similar to foam plastic 44.

The saddle 3 also includes an upper member 55 which has a generally V shape and conforms to the contour of the lower surface of the tank 2. The member 55 is bonded to the sloping walls 46 and to the layer of foam 54 located between the ribs 48.

Additional rigidity is provided for the saddle by a plurality of stiffening ribs 56 which are secured to the upper surface of the layer 55 and extend laterally of the saddle. The stiffening ribs 56 are similar to ribs 17 and are secured to the layer 55 by an additional layer or layers of fibrous material and resin which is applied over the ribs 56 and serves to integrally bond the ribs to the upper member 55.

To attach the shell 1 to the saddle 3, the flanges 47 of the saddle are connected to the inner vertical wall 57 of recesses 18 by a layer of epoxy resin and by bolts 58 as shown in FIG. 13. The trim strip 19 is secured within the recess 18 by a series of Z-shaped clips 59 having one leg secured flatwise to the wall 57 and the other leg attached to the strip 19. Each of the clips is provided with a pair of grommets 60 to receive the electrical conduit for the lights 61 secured to the trim strip 19 and for the tubing for the air brakes. The attachment of the shell to the saddle and the connection of the trim strip 19 within the recess is similar to that described in the copending application Serial No. 95,578, filed March 14, 1961, of Melvin W. Krueger.

The wheel support unit 6 includes a series of pods 62 which are secured to the lower surface of the saddle 3. As best shown in FIGS. 4, 11 and 12, each pod 62 includes a pair of side surfaces 63 and the upper portion of each side surface is disposed flatwise against the outer surface of the ribs 48. A steel or other metallic backup member 64 is embedded within the ribs 48 and the side surface 63 is connected to the ribs by a series of bolts 65 which are threaded into tapped holes in the backup plate 64.

The pods 62 also include a pair of sloping end walls 66 which are connected to the side walls 63. Each end wall 66 is provided with an outwardly extending flange 67 which is disposed flatwise along the bottom surface of the base section 45 of the saddle. The flange 67 is secured to the saddle by a layer of an adhesive such as an epoxy resin.

Added reinforcement is provided for each pod by a generally hat-shaped rib 68 which extends between the side surfaces 63 and is bonded to the bottom surface 69 of the pod. The area within the rib 68 is filled with foam plastic 70 similar to foam plastic 44 and similarly, the area within the pod 62 surrounding the ribs is also filled with foam plastic material 71 of similar nature. The foam plastic 70 and 71, along with epoxy adhesive, serves to bond the pods to the saddle as an integral rigid structure.

The pods 62 are connected together by a pair of angle bars 72 which extend longitudinally of the transport tank and are connected to a series of angle brackets 73 embedded within the side walls 63 of the pods by bolts 74 which are threaded into tapped holes in the brackets.

As best shown in FIG. 5, the angle bars 72 extend through suitable openings in the end wall 10 of the shell and are connected to and support the rear bumper 75.

A spring hanger 76 is connected to each side wall 63 of the pods 62 and the spring hangers support the wheel and axle assemblies 7. The spring hangers 76 and wheel and axle assemblies 7 are of conventional construction and form no part of the present invention.

The pods 62 which support the wheel assemblies provide a lightweight strong construction which substantially reduces the overall weight of the wheel supporting structure.

In fabricating the transport tank, the shell, including the side walls, end and rear walls and top, is formed as an integral unit in a single molding operation. In forming the shell, inserts are initially located in the inverted mold to provide the ladder wells 20 and the horizontal recesses 18 in the side walls of the shell. After placement of the inserts, all of the sharp corners in the mold are filleted with wax, clay or the like and the entire inner surface of the mold is then coated with a mold releaser or other wax-type material which will prevent the resin from sticking to the mold.

A gel coat of the liquid, uncured thermosetting resin, such as a polyester resin, is then sprayed over the entire wax surface of the mold. After curing the gel coat, alternate layers of glass cloth impregnated with a liquid polyester resin and chopped glass fibers impregnated with the resin are applied to the gel coated mold to obtain the desired wall thickness. The glass cloth is laid up by hand and the liquid resin is sprayed onto the cloth and worked into the cloth with rollers while the chopped fiber-resin mixture is applied to the cloth by spraying.

The reinforcing members 16 are then applied with their open sides disposed against the previously formed wall section of the shell. Additional layers of glass cloth and chopped glass fibers and resin are sprayed over the reinforcing members 16 to embed the same within the wall section and form the ribs 17. At this time any steel inserts necessary for the attachment of the external ladder 24 or other devices may be positioned on the wall section and additional layers of cloth and chopped fibers are applied over the steel inserts to embed the same within the walls.

After curing of the resin, the shell is stripped from the mold and the excess reinforced resin is trimmed along the edges. Filler holes 79 are then cut in the recess 18 and subsequently the foam plastic is introduced into the area between the shell and the saddle through the filler holes 79.

To form the saddle 3, the mold surface of the metal mold is initially coated with a release material such as a wax. A gel coat of polyester resin or the like is then applied to the wax surface and cured, and glass fiber cloth is laid up on the mold surface and impregnated with the liquid uncured resin. After application of the glass cloth, a layer of chopped glass fibers and resin is applied over the glass cloth and subsequently, successive alternate layers of glass cloth and chopped fibers coated with resin are applied to form the base section 45, end walls 51 and 52, with the desired thickness.

Metal mesh forms are then positioned on the base section 45 and layers of resin and glass are applied over the mesh forms to provide the longitudinal ribs 48.

Hat-shaped metal mesh forms are then positioned within the base section and layers of cloth and chopped fibers impregnated with resin are applied over the forms to form the stiffeners 53. At this time the metal inserts 64 are also positioned and secured to the base section by additional layers of cloth and chopped fibers coated with resin.

The resin is then cured to provide an integral base section 45 which includes the longitudinal ribs 48 and the hat-shaped stiffeners 53. The entire upper surface of the base section 45 and end walls 51 and 52 is then coated with an uncured liquid epoxy resin. After curing of the epoxy resin, the liquid foam plastic, such as polyurethane foam, is poured into the ribs 48 through suitable filler holes, and within the outrigger ribs 50 and between the stiffeners 53. A male die, not shown, is lowered onto the mold and provides a shallow V-shaped upper surface for the foam layer 54.

After curing of the foam, additional layers of chopped fibers and cloth impregnated with resin are applied to the upper surface of the foam 54 to provide the upper surface 55 of the saddle. The semi-cylindrical reinforcing members 56 are then applied at intervals along the length of the saddle and secured to the upper member 55 by additional layers of cloth, chopped fibers and resin.

To assemble the shell and the saddle, the shell is inverted and all the electrical wiring for the lights is then installed within the shell. The ladder rungs 21 are also positioned within the side walls and secured therein by the rods 23. The inner surface of the shell is then coated with a liquid epoxy resin and the stainless steel tank 2 is also coated with the liquid epoxy resin. After curing of the epoxy resin, the tank is inserted into the inverted shell and at this time is supported within the shell by the Z bars 33.

After positioning of the tank within the shell, the tank is pressurized with air or other gas to prevent collapse of the tank during the subsequent foaming operation. Generally, internal pressure in the range of ¼ to ⅓ p.s.i.g. is employed. The polyurethane foam is then poured in the area between the tank and the shell up to about the level of the horizontal recesses 18. The liquid resin expands upwardly to the level of the bottom of the tank and after curing, the excess foam is trimmed off and a layer of uncured epoxy resin is applied to the bottom surface of the tank which at this time is facing upwardly and to the upper surface of the saddle. The saddle is then inverted and lowered into the shell and secured to the shell by means of bolts 58.

The transport tank assembly is then righted and the liquid polyurethane resin is then poured through the filler holes 79 into the space between the tank and the saddle. After foaming and curing of the resin, the excess resin which is expanded through the holes 79 is trimmed and the exposed surface of the foam resin is coated with an epoxy resin to seal the same.

The pods 62 are molded in a manner similar to the shell 1 and are formed of alternate layers of cloth and fibers impregnated with the liquid uncured thermosetting resin. After molding of the pods, metal mesh forms are positioned within the pods and layers of cloth and chopped fibers and resin are applied over the forms to provide the hat-shaped stiffeners 68. After forming the stiffeners 68, suitable holes are drilled into the stiffeners and liquid polyurethane foam is introduced within the stiffeners and expands or foams upwardly to fill the entire stiffener. After curing of the foam within the stiffeners, the pods 62 are attached to the saddle by means of the bolts 65 and the epoxy adhesive. Suitable filler holes are then provided in the pods and additional quantities of the liquid polyurethane resin are introduced within the pods and the foaming resin fills the same. Any excess resin is sheared off and the exposed openings are covered with an epoxy resin to seal the same.

With the pods secured to the saddle, the angle bars 72 are then attached to the pods and the spring brackets 76 and wheel assemblies can then be connected thereto to complete the assembly of the transport tank.

The transport tank of the invention is a lightweight unit that weighs approximately ⅓ less than a similar all metal transport tank. This reduction in weight produces a corresponding increase in the weight of material which can be transported by the unit. The foam plastic which is disposed between the inner tank and the outer reinforced plastic shell serves as a lightweight insulating material having substantially greater insulating qualities than balsawood or cork. Furthermore, the foam plastic will not absorb moisture and will not decompose and mildew in service.

The coating or film of the cured epoxy resin serves to firmly bond the foam plastic material to the inner tank, the outer shell and the saddle. This results in a one piece integral structure which is substantially stronger than conventional types of tank trucks.

The shell 1 can be built to the full width of the state vehicle code requirements rather than being narrower than the chassis and this increased width lowers the center of gravity for the entire truck. The rear portion of the tank extends diagonally and is spaced from the outer shell to accommodate the vertical ladder well.

The width of the horizontal flat upper surfaces of both the tank and the shell is maintained at a minimum by the use of the diagonal surfaces which connect the upper surface with the respective side walls. The use of the diagonal surfaces not only increases visibility for the driver of the tractor, but also increases the strength of the tank and decreases the danger of the upper wall of the tank collapsing in the event the milk or other material is drained from the tank without first opening the manhole.

The rear wheel structure is supported by a series of lightweight fiber-reinforced plastic pods which substantially reduce the weight of the wheel supporting structure. The pods are connected together by an angle bar which can extend through the rear wall of the shell and also serve to support the bumper.

Various modes of carrying out the invention are contemplated as being within the scope of the following claims particularly pointing out and distinctly claiming the subject matter regarded as the invention.

We claim:

1. In a transport tank to be hauled by a tractor, an outer lightweight shell, a tank to contain a bulk material and disposed within the shell, said tank having a pair of substantially vertical side walls and a substantially horizontal top wall and having a pair of diagonal walls connecting the side walls and the top wall, a hollow reinforced plastic saddle disposed in spaced relation beneath the tank, said saddle having a plurality of longitudinal ribs extending the length of the saddle, a layer of foam plastic disposed within the hollow interior of the saddle, means for connecting the shell to the side edge portions of the saddle, and a second layer of foam plastic disposed between the tank and the shell and between the saddle and the tank and bonded thereto to provide an integral structure.

2. In a transport tank to be hauled by a tractor, an outer reinforced plastic shell including a pair of vertical side walls and a vertical end wall connecting the side walls together, a tank to contain a bulk material and including a pair of vertical side walls and a vertical end wall with said side walls and end wall of the tank being spaced inwardly of the corresponding walls of the shell, said tank including a substantially vertical diagonal wall connecting a side wall and the end wall to provide an area of increased space between said diagonal wall and the shell, a side wall of the shell having a vertical recess adjacent said end wall and disposed in alignment with said diagonal wall, and a series of rungs disposed across the recess in vertically spaced relation and located inwardly of the outer surface of the side walls of the shell, said recess permitting the shell to be built to the full width of the state vehicle code requirements to thereby provide a transport tank of a lower dimension and a lower center of gravity.

3. In a transport tank to be hauled by a tractor, a reinforced plastic outer shell including a substantially vertical side wall and a vertical end wall connected to the side wall, said shell having a vertical recess adjacent the end wall, a tank disposed within the shell and having a side wall spaced inwardly of the side wall of the shell and having an end wall spaced inwardly of the end wall of the shell, the portion of the side wall of the tank disposed in alignment with the recess being deformed inwardly to accommodate said recess, a layer of foam plastic disposed between the shell and the tank and bonded thereto to provide an integral structure, and a ladder disposed within the recess and located inwardly of the outer surface of the side wall of the shell.

4. In a transport tank to be hauled by a tractor, a reinforced plastic shell including a pair of substantially vertical side walls and a rear wall connecting the side walls togther, said side walls of the shell being formed with vertically extending recesses adjacent the rear wall, a tank to contain a bulk material and disposed within the shell, said tank including a pair of substantially vertical side walls spaced inwardly of the side walls of the shell and including a substantially vertical rear wall spaced inwardly of the rear wall of the shell, the portions of the side walls of the tank disposed in alignment with the recesses deviating inwardly to accommodate said recesses, said tank also including a substantially horizontal top wall and having a pair of diagonal walls connecting the side walls and the top wall, and a layer of foam plastic material disposed within the space between the shell and the tank and bonded thereto to provide an integral structure.

5. In a transport tank to be hauled by a tractor, an outer shell, a tank located within the shell and adapted to contain a material to be transported, a support member to support the shell and tank and extending the length of the tank, a hollow reinforced plastic pod secured to the lower surface of the support member, a quantity of foam plastic material disposed within the pod and bonded to the inner surfaces of the pod and to the lower surface of the support member, and means connected to the pod for supporting a wheel assembly.

6. In a transport tank adapted to be hauled by a trailer, an outer reinforced plastic shell to contain a bulk material and disposed within the shell, a saddle spaced beneath the tank and extending substantially the length of the tank, a layer of foam plastic disposed between the tank and the shell and between the tank and the saddle to provide an integral structure, a plurality of hollow wheel supporting members secured to the lower surface of the saddle, a second layer of foam plastic disposed within each of said wheel supporting members, means interconnecting the lower end portion of the wheel supporting members, and means connected to the wheel supporting members for supporting a plurality of wheel assemblies.

7. The structure of claim 6 and including a reinforcing member disposed within each wheel supporting member and extending transversely of the longitudinal centerline of the tank.

8. In a transport tank to be hauled by a tractor, an outer reinforced plastic shell including a pair of vertical side walls and a vertical end wall connected to the side walls, a tank to contain a bulk material and disposed within the shell, a reinforced plastic saddle spaced beneath the tank and connected to the shell, a layer of foam plastic disposed between the tank and the shell and between the tank and the saddle and bonded thereto to provide an integral unit, a plurality of hollow wheel supporting members secured to the lower surface of the saddle, a pair of connecting members interconnecting each of the wheel supporting members and extending through the end wall of the shell, and a bumper secured to the outer portion of the connecting members and located outwardly of said end wall.

9. The structure of claim 6 in which the saddle includes a pair of longitudinally extending depending ribs and each wheel supporting member includes a bottom surface and a pair of side surfaces with the upper edge portions of the side surfaces disposed flatwise against the side surfaces of the ribs, and said wheel supporting members including a pair of sloping end surfaces connected to said side surfaces with the upper edges of said sloping surfaces extending transversely of the ribs and secured thereto, and a reinforcing member disposed within each wheel supporting member and extending between said side surfaces, and a layer of foam disposed within the reinforcing member.

10. The structure of claim 9, in which the connecting members have generally vertical legs secured to opposite side surfaces of the wheel supporting members and have generally horizontal legs secured to the lower surfaces of said wheel supporting members.

References Cited by the Examiner
UNITED STATES PATENTS

| | | | |
|---|---|---|---|
| 1,848,191 | 3/32 | Neely | 280—5 |
| 1,902,849 | 3/33 | Gredell | 280—5 |
| 2,017,057 | 10/35 | Fitch | 182—90 |
| 2,033,457 | 3/36 | Davis | 280—5 |
| 2,237,310 | 4/41 | Norbom | 280—5 |
| 2,340,628 | 2/44 | Theriault | 280—5 |
| 2,552,641 | 5/51 | Morrison | 280—5 |
| 2,626,813 | 1/53 | Mullen | 280—5 |
| 2,714,516 | 8/55 | Brown | 280—5 |
| 2,730,772 | 1/56 | Jones | 296—31 X |
| 2,858,580 | 11/58 | Thompson | 296—31 X |
| 3,050,315 | 8/62 | Kindler et al. | 280—5 |

A. HARRY LEVY, *Primary Examiner.*

LEO FRIAGLIA, *Examiner.*